US007502845B2

(12) United States Patent
Sanghvi et al.

(10) Patent No.: US 7,502,845 B2
(45) Date of Patent: *Mar. 10, 2009

(54) EVENT CONSUMERS FOR AN EVENT MANAGEMENT SYSTEM

(75) Inventors: Ashvinkumar J. Sanghvi, Sammamish, WA (US); Howard M. Hance, Snohomish, WA (US); Lev Novik, Bellevue, WA (US); Patrick R. Kenny, Redmond, WA (US); Michael A. Thatcher, Seattle, WA (US); Alexander E. Nosov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 11/428,282

(22) Filed: Jun. 30, 2006

(65) Prior Publication Data

US 2006/0248539 A1    Nov. 2, 2006

Related U.S. Application Data

(63) Continuation of application No. 09/875,775, filed on Jun. 5, 2001, now Pat. No. 7,412,501.

(60) Provisional application No. 60/210,330, filed on Jun. 7, 2000.

(51) Int. Cl.
*G06F 15/177* (2006.01)
(52) U.S. Cl. ............... 709/223; 709/224; 719/318; 719/310; 719/321; 719/328
(58) Field of Classification Search ......... 709/220–226; 719/310, 318, 321, 328, 319
See application file for complete search history.

(56) References Cited

U.S. PATENT DOCUMENTS

| 6,154,849 | A  | * | 11/2000 | Xia ........................... 714/4 |
| 6,564,342 | B2 |   | 5/2003  | Landan |
| 6,571,285 | B1 |   | 5/2003  | Groath et al. |
| 6,658,465 | B1 |   | 12/2003 | Touboul |
| 6,662,195 | B1 |   | 12/2003 | Langseth et al. |
| 6,829,639 | B1 | * | 12/2004 | Lawson et al. ............. 709/224 |

OTHER PUBLICATIONS

Windows NT Event Logging by James D. Murray published on Sep. 1998 (pp. 1-19).*

(Continued)

*Primary Examiner*—Nathan J. Flynn
*Assistant Examiner*—Mohammad A Siddiqi
(74) *Attorney, Agent, or Firm*—Lee & Hayes, PLLC

(57) ABSTRACT

An event management system includes an email consumer for handling email, a paging consumer, an active scripting consumer, a log file consumer, an event log consumer, and a command line consumer. The events in the event management system are represented as objects and each consumer is represented as a class. The system also includes an event forwarding consumer to forward events. The event management system allows the creation of an instance of an event filter which filters events based on event filter properties. The system also allows the creation of an instance of an event consumer which defines an action and creation of a binding between the instance of the event filter and the instance of the event consumer such that the binding includes properties identifying the instance of the event filter and the instance of the event consumer.

20 Claims, 6 Drawing Sheets

OTHER PUBLICATIONS

"Network PC System Design Guidelines", by Compaq Dell Helwett Packard Intel and Microsoft published on Aug. 5, 1997, 148 pages.

Frankowski et al, "Concurrency and Multi-Threaded Interaction in the Task-Script User Interface Model," Proceedings of the IFIP TC 2/WG 2.7 Working Conference on Engineering for Human-Computer Interaction, Napa Valley, CA, Aug. 21-25, 1989, pp. 359-383.

Hildyard, "Generalized Event Handling in JavaScript" Web Techinques, Script Junkie, retreived on Dec. 4, 2000 at <<http:/www.webtechniques.com/archives/1999/02/junk/>> Feb. 1999, 6 pgs.

"IEEE standards for local and metropolitan area networks: supplemnt to LAN/MAN management, Discovery and dynamic control of event forwarding," Abstract form Inst. Electr. & Electron. Eng., Jul. 8, 1993, 1 pg.

Toh, et al., "CORBA event services: experiments with cascaded channels," Abstract from Journal of the Institution of Engineers Singapore, vol. 39, No. 1, 1999, 1 pg.

Wolf et al, "EARL-A Programmable and Extensible Toolkit for Analyzing Event Traces of Message Passing Programs," Lecture Notes in Computer Science, vol. 1593, 1999, pp. 502-512.

* cited by examiner

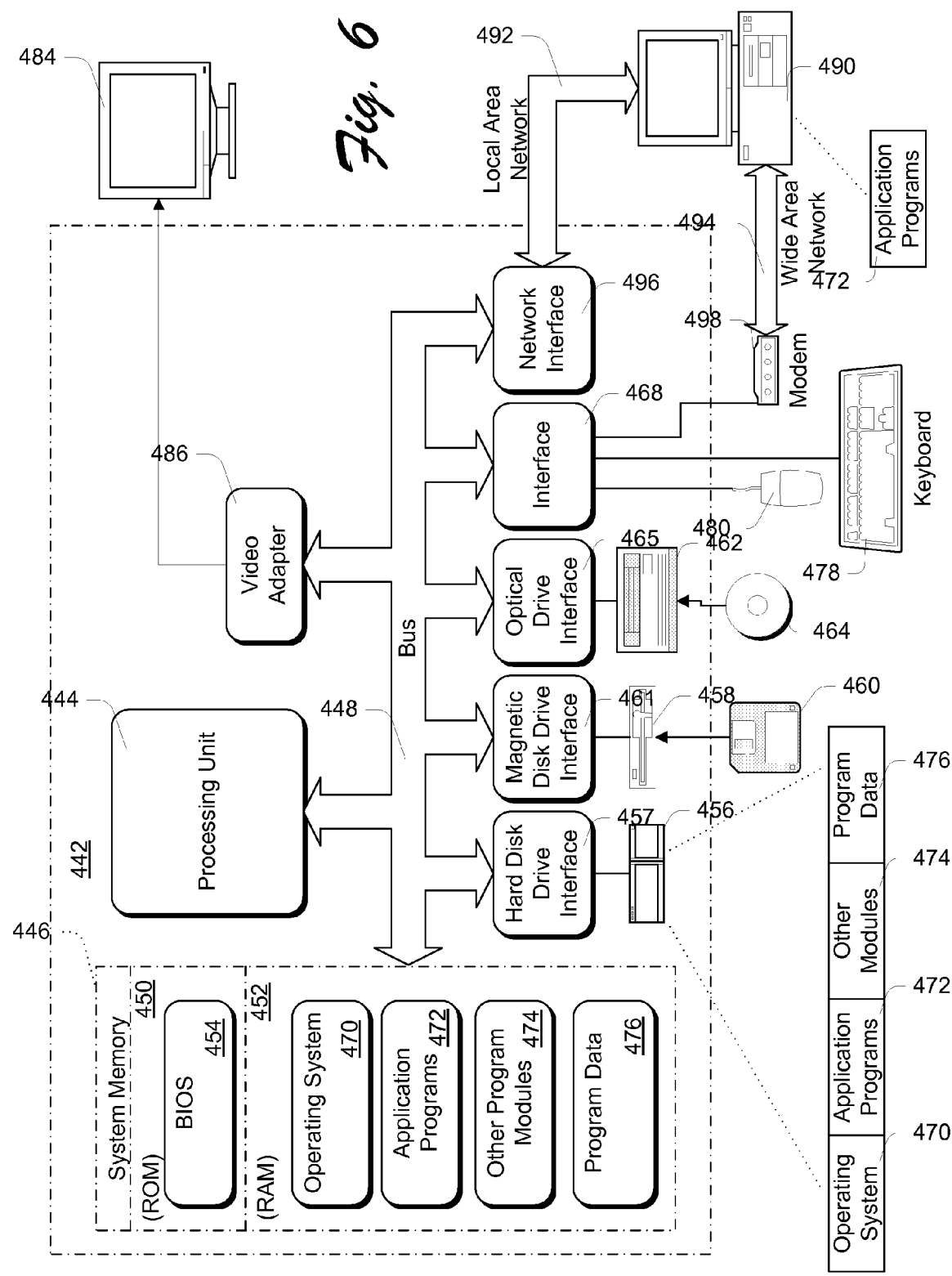

though a user may be able to read the description that is displayed by the program, he or she cannot edit the description.

EVENT CONSUMERS FOR AN EVENT MANAGEMENT SYSTEM

RELATED APPLICATIONS

This application claims the benefit of and is a continuation application of U.S. patent application Ser. No. 09/875,775, filed Jun. 5, 2001 (which issued as U.S. Pat. No. 7,412,501), which in turn claims the benefit of U.S. Provisional Application No. 60/210,330, filed Jun. 7, 2000.

TECHNICAL FIELD

The present invention relates to computing systems and, more particularly, to event consumers, such as application programs, that receive events generated by components, services and applications in a computing environment.

BACKGROUND

Computer systems, such as servers and desktop personal computers, are expected to operate without constant monitoring. These computer systems typically perform various tasks without the user's knowledge. When performing these tasks, the computer system often encounters events that require a particular action (such as logging the event, generating an alert for a particular system or application, or performing an action in response to the event). Various mechanisms are available to handle these events.

A computing enterprise typically includes one or more networks, services, and systems that exchange data and other information with one another. The enterprise may include one or more security mechanisms to safeguard data and authenticate users and may utilize one or more different data transmission protocols. At any particular time, one or more networks, services or systems may be down (e.g., powered down or disconnected from one or more networks). Networks, services or systems can be down for scheduled maintenance, upgrades, overload or failure. Application programs attempting to obtain event data must contend with the various networks, services, and systems in the enterprise when they are down. Additionally, application programs must contend with the security and network topology limitations of the enterprise as well as the various protocols used in the enterprise.

A typical computing environment includes multiple event consumers (i.e., applications and other routines that use various event data generated by one or more event sources or event providers). These event consumers are typically implemented by network administrators or other individuals responsible for the operation of the computing environment. An administrator generally implements many different event consumers to properly handle the various events generated throughout the computing environment. A particular administrator may be responsible for a portion of the computing environment, such as the computing devices in a particular building or the computing devices associated with a particular department in an organization. Different administrators may implement duplicate (or substantially similar) event consumers stored in different portions of the computing environment. The creation of duplicate event consumers is wasteful of the administrators' time and wastes storage space by storing redundant event consumers.

The system and method described herein addresses these limitations by providing a standard set of event consumers for handling various common events (i.e., events that are likely to be handled by multiple administrators). The system and method described herein also provides a standard schema that allows event consumers to use event data without requiring knowledge of the source of the event data.

SUMMARY

The system and method described herein provide a standard set of commonly used event consumers, thereby eliminating the need for an administrator to implement those event consumers. Providing a standard set of common event consumers also reduces the number of redundant consumers stored throughout the computing environment. The use of a standard schema for defining event data allows an event consumer to accept and used event data from any event source. The event consumer does not require any knowledge about the event source to process the event. Similarly, the event source does not require any knowledge of the event consumer to generate event data.

In one embodiment, an event management system includes an email consumer for handling email, a paging consumer, an active scripting consumer, a log file consumer, an event log consumer, and a command line consumer.

In a described embodiment, a procedure includes creating an instance of an event filter which filters events based on event filter properties. The procedure also includes creating an instance of an event consumer which defines an action and creating a binding between the instance of the event filter and the instance of the event consumer.

In a particular embodiment, a schema includes at least one event consumer class that represents a consumer of an event. The schema also includes at least one event filter class that represents event filtering parameters and at least one binding class that represents the association of at least one event consumer and at least one event filter.

BRIEF DESCRIPTION OF THE DRAWINGS

FIG. 6 illustrates an example of a suitable operating environment in which the event-handling system and method may be implemented.

DETAILED DESCRIPTION

Figure 1:
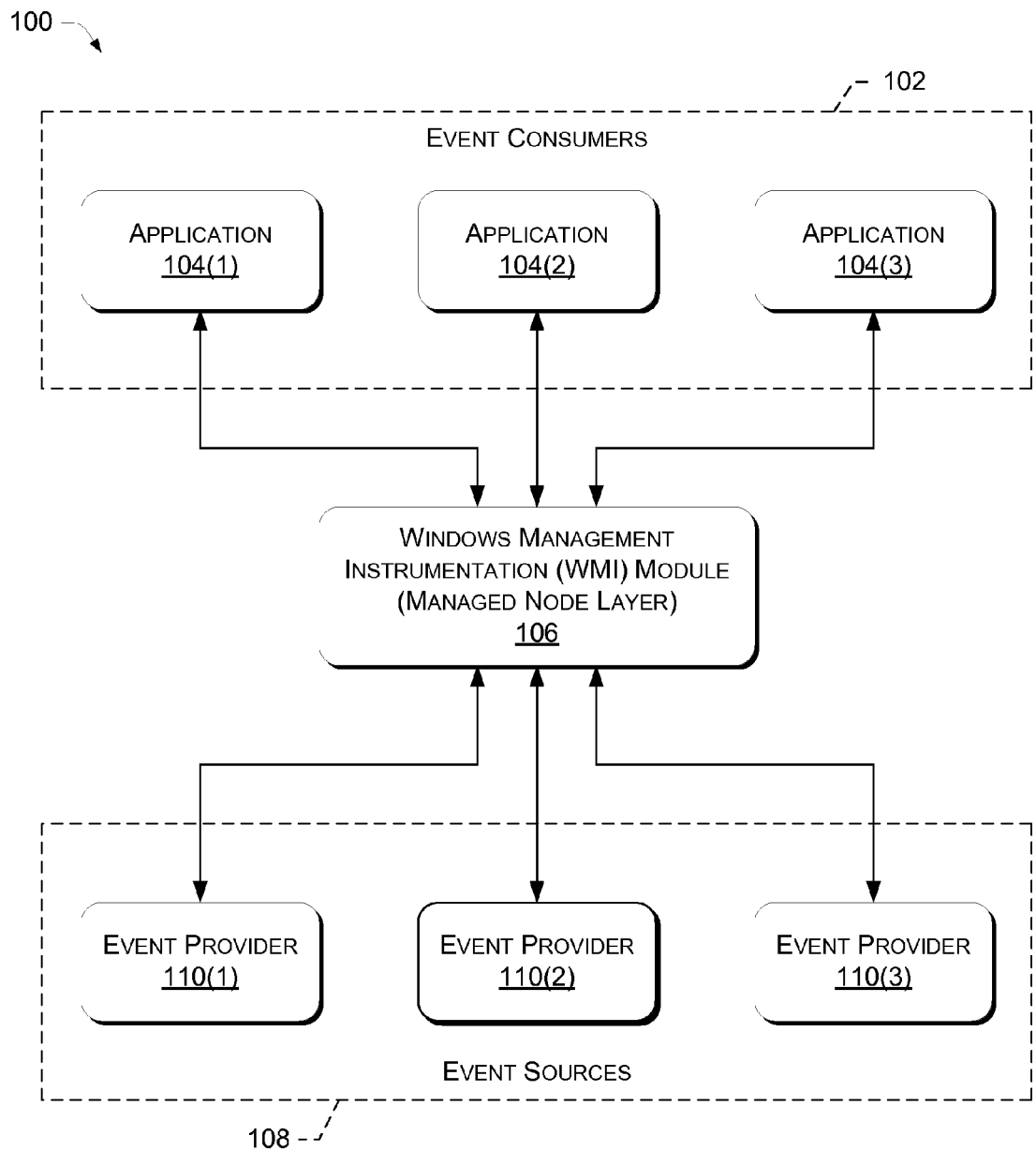
FIG. 1 illustrates a block diagram of a system that receives event information from multiple event providers and provides event information to multiple event consumers.

The system and method described herein provide a standard set of event consumers for use throughout a computing environment. This standard set of event consumers includes an email consumer (such as an SMTP consumer), a script consumer, a paging consumer, a log to file consumer, an event log consumer, a command line consumer, and an event forwarding consumer. The use of these standard event consumers eliminates the need for administrators to implement such consumers and reduces the number of redundant (or substantially similar) consumers in the computing environment. A standard schema is described for defining and handling event data. This standard schema allows an event consumer to utilize event data from any source without requiring any knowledge of the event source. Additionally, the event data can be generated without knowledge of the event consumer that may utilize the event data.

Web-Based Enterprise Management (WBEM) provides uniform access to management information throughout an enterprise. WBEM is an industry initiative to develop technology for accessing management information in an enterprise environment. This management information includes, for example, information on the state of system memory, inventories of currently installed client applications, and other information related to the status of the system. A particular embodiment of the event-handling system is implemented using Windows® Management Instrumentation (WMI) developed by Microsoft Corporation of Redmond, Wash., which provides an infrastructure to handle various events generated by event sources throughout an enterprise.

The WMI technology enables systems, applications, networks, and other managed components to be represented using the Common Information Model (CIM) designed by the Distributed Management Task Force (DMTF). CIM is an extensible data model for representing objects that exist in typical management environments. CIM is able to model anything in the managed environment, regardless of the location of the data source. The Managed Object Format (MOF) language is used to define and store modeled data. In addition to data modeling, WMI provides a set of base services that include query-based information retrieval and event notification. Access to these services and to the management data is provided through a single Component Object Model (COM) programming interface.

The WMI schema includes multiple classes. Each WMI class is associated with a system or subsystem in, for example, an enterprise. WMI classes define the basic units of management. Each WMI class is a template for a type of managed object. For example, Win32_DiskDrive is a model representing a physical disk drive. For each physical disk drive that exists, there is an instance of the Win32_DiskDrive class. WMI classes may contain properties, which describe the data of the class and the methods (which describe the behavior of the class).

WMI classes describe managed objects that are independent of a particular implementation or technology. WMI includes an eventing subsystem that follows the publish-subscribe model, in which an event consumer subscribes for a selection of events (generated by one or more event providers) and performs an action as a result of receiving the event. WMI also provides a centralized mechanism for collecting and storing event data. This stored event data is accessible by other systems via WMI tools and/or application programming interfaces (APIs).

Although particular embodiments are discussed herein as using WMI, alternate embodiments may utilize any enterprise management system or application, whether web-based or otherwise. The event providers and event consumers discussed herein are selected for purposes of explanation. The teachings of the present invention can be used with any type of event provider and any type of event consumer. Additionally, the event-handling system and method described herein can be applied to any type of enterprise or other arrangement of computing devices, applications, and/or networks.

FIG. 1 illustrates a block diagram of a system 100 that receives event information from multiple event providers 108 (i.e., event sources) and provides event information to multiple event consumers 102 (i.e., the users of the event data). System 100 includes a WMI module 106, which receives event data from multiple event sources 108 and receives requests for information (e.g., notification of particular events) from multiple event consumers 102. Event sources 108 may include, for example, managed nodes or managed systems in a network. The multiple event sources are identified as event providers 110. The multiple event consumers are identified as applications 104.

WMI module 106 shown in FIG. 1 represents the managed node layer of the WMI module. As discussed below, the WMI module 106 may also include a central store layer, which may include user interface functionality. The different layers of WMI module 106 manage different types of activities and/or perform different types of functions.

Event providers 110 include, for example, systems, services or applications that generate event data. An exemplary event provider is a disk drive (or an application that monitors the status of a disk drive). The disk drive may generate an event indicating the available storage capacity on the disk drive or indicating the amount of data currently stored on the disk drive. The disk drive may also generate an event indicating that the disk drive is nearly full of data (e.g., when ninety-five percent or more of the disk drive's capacity is used).

Event consumers 102 may request to be notified of certain events (also referred to as "subscribing" to an event). An example event consumer is an application that manages multiple storage devices in an enterprise. The application may request to receive events generated by any of the disk drives or other storage devices in the enterprise. The application can use this event information to distribute storage tasks among the multiple storage devices based on the available capacity of each device and/or the quantity of read or write requests received by each storage device.

Figure 2:
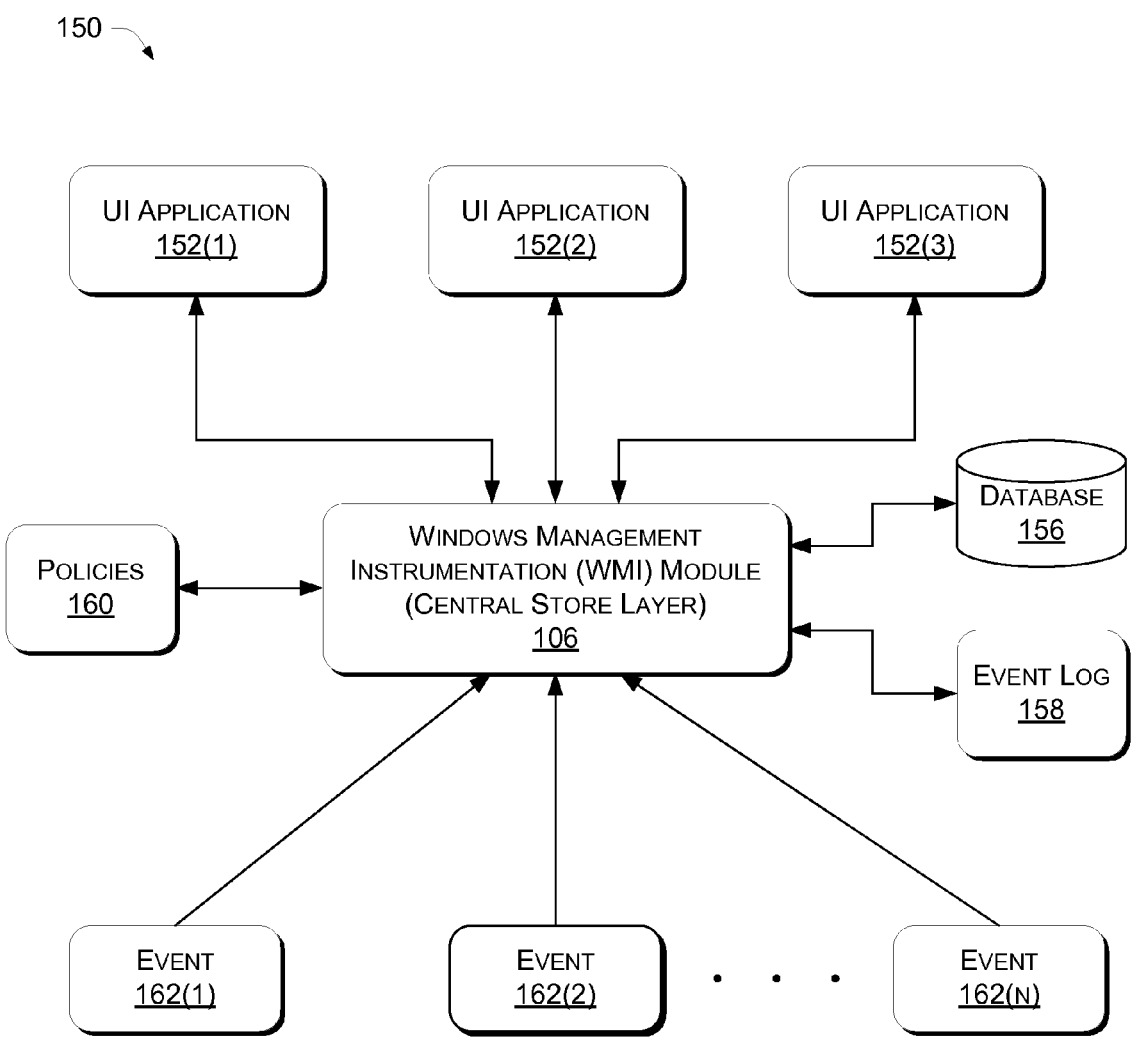
FIG. 2 illustrates a block diagram of a system that receives events and logs those events to an event log.

FIG. 2 illustrates a block diagram of a system 150 that receives events and logs those events to an event log. System 150 includes a central store layer of WMI module 106, which is coupled to multiple user interface (UI) applications 152. UI applications 152 are used to access WMI module 106 to retrieve data, manage systems, and configure various enterprise management parameters. The central store layer of WMI module 106 provides for the centralized logging and storage of event data received from various nodes and various networks in an enterprise. WMI module 106 is also coupled to receive events 162 from one or more event sources. For example, events may be received from the managed node layer of WMI module 106, discussed above with respect to FIG. 1, from an event forwarding application (e.g., application 104), or from one or more event providers (e.g., event provider 110).

System 150 also includes a set of policies 160, which are accessible by WMI module 106. Policies 160 may control the configuration of one or more systems in the enterprise. Other policies may define various activities, such as event filtering, event correlation, and the forwarding of events to particular devices or applications. A database 156 is coupled to WMI module 106. Database 156 stores various information related to the enterprise. For example, database 156 can store event data (i.e., creating an event log), policy data, and enterprise configuration information.

WMI module 106 is also coupled to an event log 158. The event log 158 uses WMI features to provide a distributed architecture that is capable of selecting, filtering, correlating, forwarding, storing, and delivering event data in an enterprise. The event log 158 allows users, such as administrators, to request data related to a particular event, request data from a particular node or device in the enterprise, define the manner in which events are correlated with one another, define how certain events should be forwarded, and define how to store event data. Data requests may be accessed from the event log 158 using, for example, a particular UI application 152. The event log 158 uses an event provider model that allows an application, device or driver to generate events.

The event log 158 provides a policy-based administration of the enterprise. The policy infrastructure allows administrators to set a policy in the Directory Service (DS) and the WMI module ensures that the proper set of WMI objects (e.g., filters, bindings, correlators, consumers, and configuration objects) are delivered to the proper devices or applications in the enterprise.

Table 1 below identifies various types of event providers available in a particular embodiment. Additionally, the table includes a description of the events generated by each event provider. For example, the Win32 Provider generates events that include information related to the operating system, computer system, peripheral devices, file systems, and security for a particular device (such as a computer system) in the enterprise.

TABLE 1

| Event Provider | Description of Events Provided |
| --- | --- |
| Win32 Provider | Supplies information about the operating system, computer system, peripheral devices, file systems, and security. |
| WDM Provider | Supplies low-level Windows Driver Model (WDM) information for user input devices, storage devices, network interfaces, and communications ports. |
| Event Log Provider | Allows the reading of Windows NT event log entries, controls the configuration of event log administrative options, and event log backup. |
| Registry Provider | Allows registry keys to be created, read, and written. WMI events can be generated when specified Registry keys are modified. |
| Performance Counter Provider | Exposes the raw performance counter information used to compute various performance values. |
| Active Directory Provider | Acts as a gateway to information stored in Microsoft Active Directory services. Allows information from both WMI and Active Directory to be accessed using a single API. |
| Windows Installer Provider | Supplies information about applications installed with the Windows Installer. |
| SNMP Provider | Acts as a gateway to systems and devices that use SNMP for management. Allows SNMP traps to be automatically mapped to WMI events. |

Figure 3:
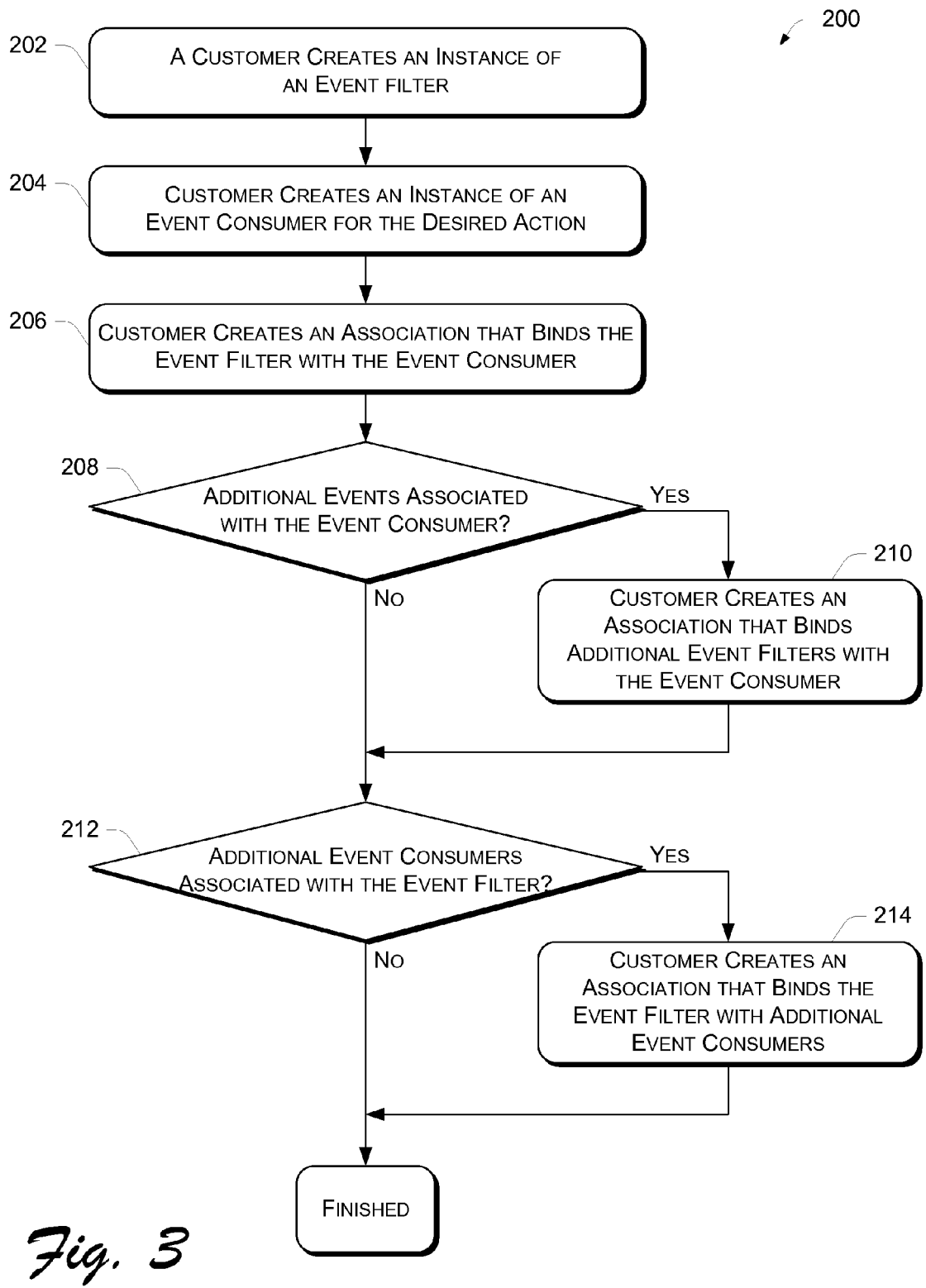
FIG. 3 is a flow diagram illustrating a procedure for implementing event consumers.

FIG. 3 is a flow diagram illustrating a procedure 200 for implementing event consumers. Initially, a customer (such as an administrator) creates an instance of an event filter (block 202) to specify the events that should trigger an action. Next, the customer creates an instance of an event consumer for the desired action (block 204) to specify the parameters of the action to be taken. The customer then creates an association that binds the event filter with the event consumer (block 206). This association indicates that the specified action is to be performed when events matching the event filter criteria occur. A customer can bind one event filter to several event consumers, indicating that when matching events occur, several actions are to be performed. Similarly, a customer can bind one event consumer to several event filters such that the specified action is performed whenever events matching any of the event filters occur.

Referring again to FIG. 3, if additional events are to be associated with the event class (block 208), then procedure 200 branches to block 210, where the customer creates an association that binds one or more additional event filters with the event consumer. If additional event consumers are to be associated with the event filter (block 212), then procedure 200 branches to block 214, where the customer creates an association that binds the event filter with one or more additional event consumers. The procedure illustrated in FIG. 3 may be repeated, as necessary, to implement additional event consumers.

Figure 4:
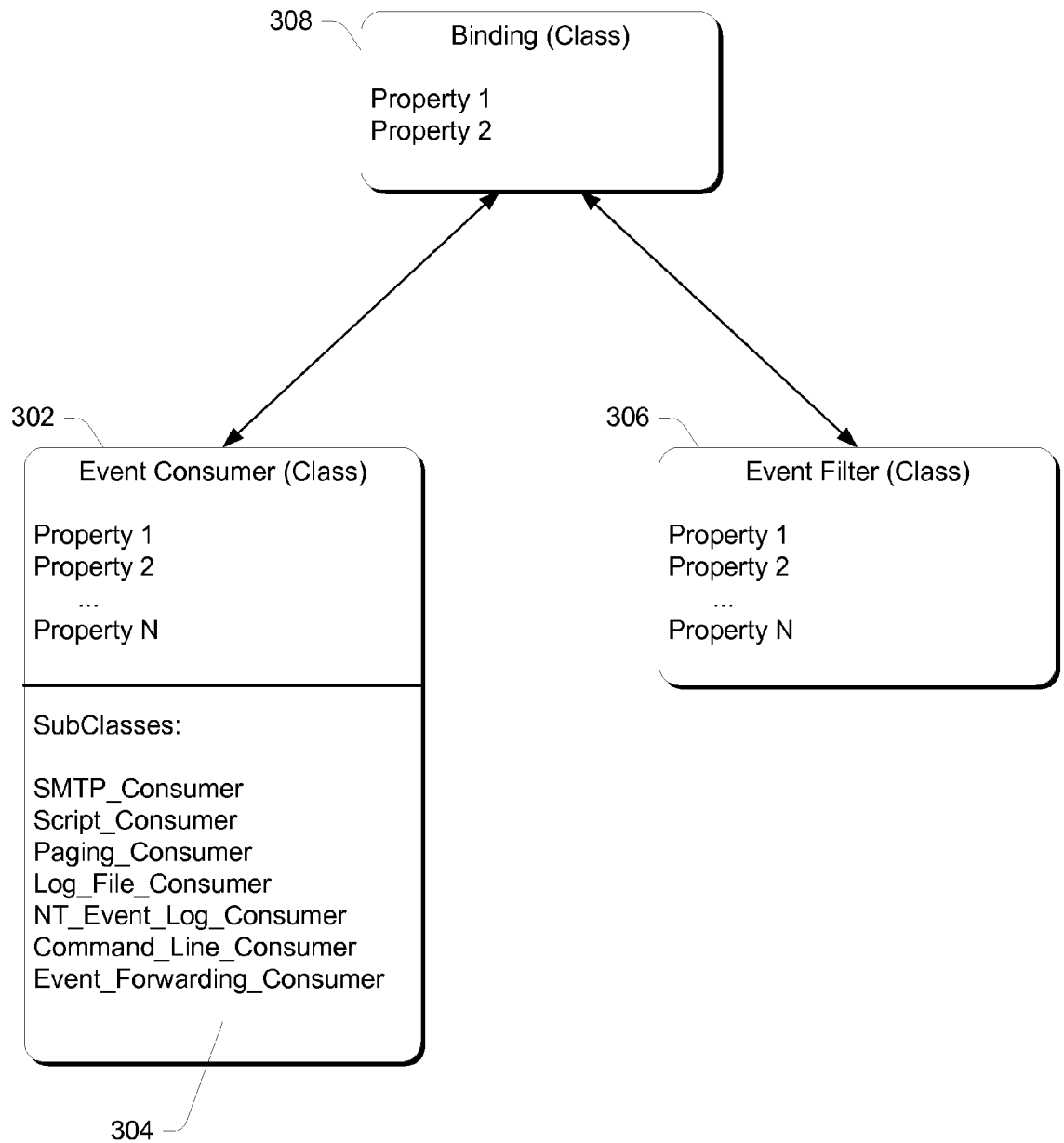
FIG. 4 illustrates the binding of an instance of an event consumer with an instance of an event filter.

FIG. 4 illustrates the binding of an instance of an event consumer with an instance of an event filter. An event consumer 300 is a class that includes one or more properties, labeled Property 1, Property 2, . . . Property N. The event consumer properties specify one or more actions to be performed in response to the occurrence of a particular event. Event consumer 300 includes multiple subclasses 304. In a particular embodiment, the subclasses of event consumer 300 are an SMTP consumer for handling mail messages, a script consumer for executing scripts, a paging consumer for initiating paging messages, a log to file consumer to log event data to a file, an NT event log consumer to log event data to an NT event log, a command line consumer for executing command line instructions, and an event forwarding consumer to forward events from one system to another. These various subclasses are discussed in greater detail below.

An event filter 306 is a class that includes one or more properties, labeled Property 1, Property 2, . . . Property N. The event filter properties identify the events that should cause one or more actions to be performed. A binding 308 is a class that includes at least two properties, labeled Property 1 and Property 2. An instance of binding 308 creates an association between an instance of an event consumer 302 and an instance of an event filter 306. The two binding properties identify event consumer 302 and event filter 306 as the two instances that are bound together by binding 308. After event consumer 302 and event filter 306 are bound together, the event consumer is executed when the filter event occurs. Specific examples of event consumers, event filters and the bindings between them are discussed below.

If the action designated by a consumer fails to execute (the definition of a failure is specified with every consumer type), WMI will generate a ConsumerFailureEvent event. The event contains as properties both the original event that failed to be delivered, and the logical consumer instance representing the failing consumer. Interested clients can register to receive these events, or perform specific actions upon their receipt.

In a number of event consumers, an occasion arises to create a string that is partly configured in the event consumer instance, and partly derived from the event in question. For these cases, a template language similar to the NT environment variable specification is used. Following are some examples of the syntax used in the templates:

"Some Text Here" will always produce "Some Text Here"

"% CPUUtilization %" will always produce the value of the CPUUtilization property of the event being delivered, converted to a string if necessary, e.g. "90"

"The CPU utilization of my processor is % CPUUtilization % at this time" will embed the value of the CPUUtilization property of the event into the string, producing something like "The CPU utilization of my processor is 90 at this time".

"% TargetInstance.CPUUtilization %" will retrieve the CPUUtilization property of the embedded instance in TargetInstance.

"%%" produces a single % sign

If the property being retrieved is an array, the entire array will be produced, in the format of (1, 5, 10, 1024). If there is only one element in the array, parenthesis will be omitted. If there are no elements in the array, "( )" will be produced.

If a property is an embedded object, the MOF representation of the object will be produced (similar to GetObjectText).

If a property of an array of embedded objects is requested, it is treated as a property with the value of an array. For instance, % MyEvents.TargetInstance.DriveLetter % could produce '("c:", "d:")' if MyEvents is an array of embedded instance modification events.

If a property of a consumer class is interpreted to be a template according to the above rules, it is marked with a [template] qualifier.

In a particular embodiment, the event consumers described herein are implemented as dynamically linked libraries (DLLs), except for the active scripting consumer, which is discussed below. In this embodiment, the event consumers execute in the security context of the LocalSystem. Further, only authorized users (e.g., administrators) are permitted to configure standard event consumers of the type described herein. The list of authorized users may vary from one event consumer to another.

Details regarding the various event consumers and their associated properties are described below.

Log File Event Consumer

This event consumer will write customized strings to a text log file whenever events are delivered to the consumer. The strings will be separated by end-of-line sequences. The logical consumer class for the log file event consumer is:

```
class LogFileEventConsumer : __EventConsumer
{
    [key] string Name;
    string Filename;
    [template] string Text;
    uint64 MaximumFileSize;
    boolean IsUnicode;
};
``` where

"Filename" is the name of the file to which the log entries are appended

"Text" is the template (as described above) for the text of the log entry

"MaximumFileSize" is the maximum size (in bytes) that the log file will be allowed to grow. If the primary file exceeds its maximum size, its contents will be moved to another file, and the primary file will be emptied. Default is 0, which will be interpreted as no limit.

"IsUnicode" is true if the file in question should be a UNICODE (as opposed to MBC) file.

The naming structure for the backup files will be as follows:

If the original filename is 8.3, the extension will be replaced by a string of the format "001", "002", etc, with the smallest number larger than all those used chosen each time (unless "999" is used, in which case the smallest unused number is chosen).

If the original filename is not 8.3, the suffix described above will be appended to the filename.

The file is opened for shared write access. Any failure to open or write to the file will be considered a failure of the action (this includes the case where another application has the file opened with exclusive access). The user who created the binding as identified by the CreatorSID property must have write access to the file in question at the time the event is generated in order for the consumer to write to the file.

Command-Line Event Consumer

This event consumer can launch an arbitrary process whenever an event is delivered to the consumer. The process will be launched in the LocalSystem security context. The logical consumer class for the command-line event consumer is:

```
class WMI__CommandLineEventConsumer : __EventConsumer
{
    [key] string Name;
    [not__null] string ExecutablePath;
    [template] string CommandLineTemplate;
    boolean UseDefaultErrorMode = FALSE;
    boolean CreateNewConsole = FALSE;
    boolean CreateNewProcessGroup = FALSE;
    boolean CreateSeparateWowVdm = FALSE;
    boolean CreateSharedWowVdm = FALSE;
    sint32 Priority = 32;
    string WorkingDirectory;
    string DesktopName;
    string WindowTitle;
    uint32 XCoordinate;
    uint32 YCoordinate;
    uint32 XSize;
    uint32 YSize;
    uint32 XNumCharacters;
    uint32 YNumCharacters;
    uint32 FillAttribute;
    uint32 ShowWindowCommand;
    boolean ForceOnFeedback = FALSE;
    boolean ForceOffFeedback = FALSE;
    boolean RunInteractively = FALSE;
    uint32 KillTimeout = 0;
};
``` where all the parameters are as documented in the Win32 Software Developers Kit (SDK), available from Microsoft Corporation of Redmond, Wash., for CreateProcess function (and its parameter STARTUPINFO), except:

"CommandLineTemplate" is a template (as described above), e.g. "C:\winnt\runreport % TargetInstance.DriveLetter %"

"RunInteractively" can be set to TRUE to force the process to be launched in the interactive winstation. Otherwise, the process is launched in the default service winstation. This property overrides the "DesktopName", which can also be used to select a specific winstation and desktop.

"KillTimeout" can be specified to have WinMgmt kill the launched process after a specified number of seconds.

Failure to launch the process (CreateProcess) will be considered a failure of the action. Failure return code from the process will not be considered a failure of the action. In one embodiment, only local administrators are allowed to register this event consumer, because the process in question will run as LocalSystem.

NT Event Log Event Consumer

NT event log event consumer will log a specific message to the NT Event Log whenever an event is delivered to the consumer.

The NT Event Log requires that the message text of all entries be placed in a message DLL, properly installed on the system on which events are logged. This event consumer does not change this requirement. It is still the responsibility of the customer to properly register an NT Event Log "Source" with the message texts; once that is done, however, this consumer can log NT Event Log entries based on that source whenever designated WMI events occur.

The logical consumer class for the NT event log event consumer is:

```
class NTEventLogEventConsumer : _EventConsumer
{
    [key] string Name;
    string UNCServerName;
    string SourceName;
    [not_null] uint32 EventID;
    uint32 EventType = 1;
    uint32 Category;
    [template] string InsertionStringTemplates[ ] = {""};
};
``` where

"UNCServerName" is the name of the machine on which to log the event, or NULL if the machine is a local server.

"SourceName" is the name of the NT Event Log Source in which the message is to be found. As mentioned above, the customer is assumed to have registered a DLL with the necessary messages under this source.

"EventID" is the id of the event message in the Source.

"EventType" is the type of the event being generated, e.g. Informational, Warning, or Error.

"Category" is as documented in the Win32 SDK ReportEvent function.

"InsertionStringTemplates" is an array of templates whose values are used as the insertion strings for the event log record.

Failure to write the event (ReportEvent) is considered a failure. Lack of installed message DLL for the Source, use of out-of-range IDs, or invalid number of Insertion Strings are not considered failures.

Active Scripting Event Consumer

The active scripting event consumer will execute a pre-defined script in an arbitrary scripting language whenever an event is delivered to the consumer. While the text of the script itself is specified in the event consumer instance, the script will have access to the event instance in the script environment variable TargetEvent. For instance, MsgBox TargetEvent.TargetInstance.DriveLetter in VBScript would bring up a message box with the drive letter of the event in the message box.

The scripts will execute in the security context of LocalSystem. In a particular embodiment, as a security measure to prevent abuse, only a local system administrator or a domain administrator may configure the active scripting event consumer. The access rights are not checked until runtime. Once the consumer is configured, any user may trigger the event that causes the script to be executed.

The logical consumer class for the active scripting event consumer is:

```
class ActiveScriptEventConsumer : _EventConsumer
{
    [key] string Name;
    string ScriptingEngine;
    string ScriptText;
    string ScriptFileName;
    [units("seconds")] uint32 KillTimeout;
};
``` where

"ScriptingEngine" is the ProgID of the scripting engine to use, e.g. "VBScript" or "JScript".

"ScriptText" is the text of the script to execute. "ScriptText" may be NULL, in which case ScriptFileName is used.

"ScriptFileName" is the name of the file from which the text of the script is read, unless ScriptText is specified. Only one of "ScriptText" or "ScriptFileName" may have a value.

"KillTimeout" specifies the number of seconds after which the script will be terminated if not already finished. Killing a script via the timeout is considered an error. If "KillTimeout" is zero or NULL, the script will not be terminated.

There is also a global configuration class in the root\cimv2 namespace that applies to all instances of the consumer:

```
class ScriptingStandardConsumerSetting : CIM_Setting
{
    string SettingID = "ScriptingStandardConsumerSetting";
    string Caption = "Scripting Standard Consumer Setting";
    string Description = "Registration data common to all instances
of the Scripting Standard Consumer";
    uint32 MaximumScripts;
    uint32 Timeout;
};
``` where

"SettingID", "Caption", and "Description" identify and document the class, and should not be overridden.

"MaximumScripts" specifies the maximum number of scripts that will be run from any one instance of the consumer before starting a new instance. Default value: 300. A value of zero or NULL will result in the default being used.

"Timeout" specifies the maximum amount of time in minutes that the consumer will be allowed to run before starting a new instance of the consumer. If zero, lifetime is controlled by the "MaximumScripts" property. Valid Range: 0-71,000.

The primary purpose of the "MaximumScripts" and "TimeOut" properties is to ensure that the consumer will eventually shut down, thereby removing any memory or resource leaks caused by poorly written scripts. Failure to load the scripting engine or parse and validate the script is considered a failure. Error return code from the script is likewise considered a failure. The active scripting event consumer will run in a separate process due to its inherent danger.

SMTP Event Consumer

The SMTP event consumer will send an e-mail message via SMTP each time an event is delivered to the consumer. An SMTP server must exist on the network for the SMTP event consumer to work properly. The logical consumer class for the SMTP event consumer is:

```
class SMTPEventConsumer : _EventConsumer
{
    [key] string Name;
    string SMTPServer;
    string Subject;
    string Message;
    [not_null] string ToLine;
    string CcLine;
    string BccLine;
};
``` where

"SMTPServer" is the name of the SMTP server through which mail will be sent. For example, IP addresses, DNS or NetBIOS names can be used to identify the SMTP server.

"Subject" is the template for the subject of the message.

"Message" is the template for the body of the message.

"ToLine" is the semi-colon-separated list of addresses to send the message to.

"CCLine" is the semi-colon-separated list of addresses to CC.

"BccLine" is the semi-colon-separated list of addresses to BCC.

Failure to send mail (error return code from the service) is considered a failure.

Paging Event Consumer

The paging event consumer will page an arbitrary phone number with an arbitrary message, using industry-standard TAP protocol. No TAPI provider needs to be installed on the server. The logical consumer class for the paging event consumer is:

```
class TAPIEventConsumer : __EventConsumer
{
    [key] string Name;
    string PhoneNumber;
    string ID;
    string Message;
    string Port;
    uint32 BaudRate;
    string ModemSetupString;
    uint32 AnswerTimeout = 30;
};
``` where

"PhoneNumber" is the number to dial. Any non-numeric symbols in this string are ignored.

"ID" is the paging subscriber ID.

"Message" is the alphanumeric message to be sent,

"Port" is the port to which the modem is connected (e.g. "COM1").

"BaudRate" is the maximum baud rate to use. If left NULL, the maximum available rate will be used.

"ModemSetupString" should be left NULL except when the TAP server is not compliant with the protocol's suggested defaults.

"AnswerTimeout" is the number of seconds to wait for the server to pick up the phone. The default value is 30 seconds.

Figure 5:
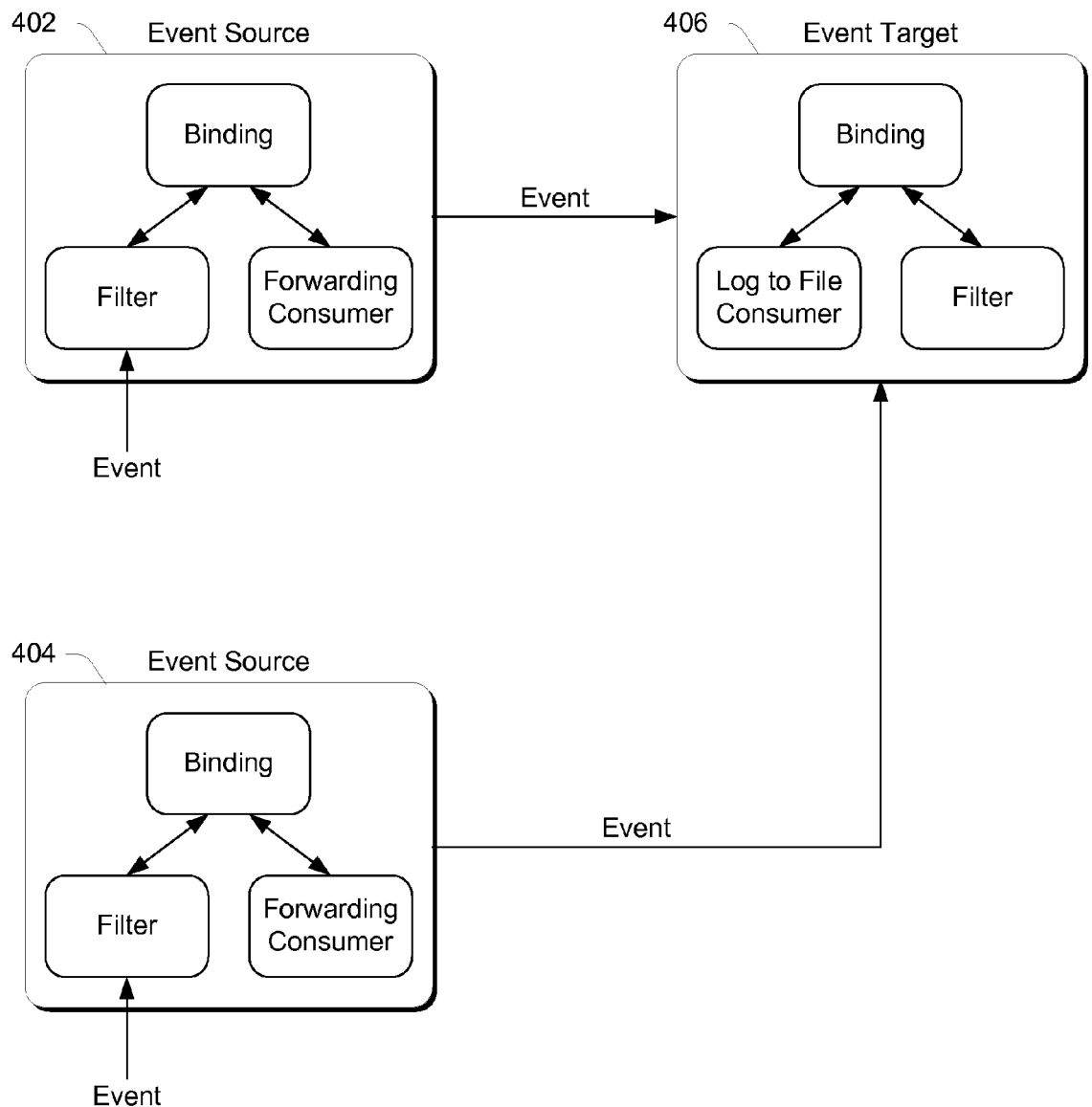
FIG. 5 illustrates the forwarding of events from multiple event sources to a common event target.

FIG. 5 illustrates the forwarding of events from multiple event sources to a common event target. A pair of event sources 402 and 404 each forward certain events (determined by the appropriate filter properties) to an event target 406. In a particular embodiment, event target 406 is a central event logging computer that logs event data from many different event sources. Although FIG. 5 illustrates two event sources 402 and 404, alternate embodiments may include any number of event sources coupled to event target 406.

Each event source 402 and 404 includes an instance of a forwarding consumer, an instance of a filter, and an instance of a binding that binds the forwarding consumer to the filter. Event target 406 includes an instance of a log-to-file consumer, an instance of a filter, and an instance of a binding that binds the log-to-file consumer to the filter. Events received by or generated by event source 402 or 404 that meet the filter criteria (as defined by the filter properties) are forwarded by the forwarding consumer to the event target 406 for logging. Events received by event target 406 may be processed or forwarded to another event target (not shown) for processing or further forwarding. Thus, a particular event may be forwarded through multiple devices until a destination device is reached.

Forwarding Consumer Provider

The Forwarding Consumer Provider provides sinks (e.g., a piece of code that accepts events) for the Data and Event Logical Forwarding Consumer instances. It exists as a DLL and is an in-proc COM object.

The forwarding consumer provider uses the "WbemMessageSender" COM objects to send messages. This insulates the forwarding consumer provider from sending messages via MSMQ, Named-Pipes, etc. See the WBEM Messaging Layer specification for more details.

The "IwbemObjectInternals" interface is used for marshaling objects. The forwarding consumer will not send class information as part of the message. It will send a classname, decoration and instance data. When sending multiple objects, their class and decoration data is packaged once. The "IwbemObjectInternals" interface is an internal COM interface.

Format:

```
DWORD dwSig; // FCON in ascii
char cVersionMajor; // 1
char cVersionMinor; // 0
char cType; // 0 - for event, 1 for data
char cLast; // 0 - for FALSE, 1 - for TRUE
DWORD dwReserved; // not used
GUID CorrelationId; // not used for event types
DWORD dwObjs; // num objs in this message
String ClassName - null terminated.
Decoration Part // only one.
Instance Part // dwObjs instances
```

Table 2 below is used to determine the target queue when one is not specified. See Forwarding Queues for more details.

TABLE 2

| Sender Operation Mode | Delivery Class | Target Queue |
| --- | --- | --- |
| N/A | Synchronous | N/A |
| On-Line | Express | Public, Private(D) |
| On-Line | Guaranteed | Public Guaranteed, Private Guaranteed(D) |
| Off-Line domain member | Express | Private (D) |
| Off-Line domain member | Guaranteed | Private Guaranteed(D) |
| Off-Line workgroup | Express | Private(D) |
| Off-Line workgroup | Guaranteed | Private Guaranteed(D) |

(D)—Direct MSMQ Format Name

Event Forwarding Consumer

Each event or event batch that is indicated to the consumer will be packaged into a single message and sent to the target.

Data Forwarding Consumer

When obtaining the results of the query, the results will be packaged into one or more messages. The number of objects in a message depends on their size. The granularity of these messages is around 512K. There will be an indication in the last message that it is the last one. This is set in the "last" property of the forwarded consumer message. This will signal the event provider to signal a null termination event.

Forwarded Message Provider

There are two types of forwarding queues: Express and Guaranteed. Both queues have identical properties, they are just serviced differently. When the machine is online, there will be two MSMQ queues for each type: Public and Private. When the machine is offline, there will be only one MSMQ queue for each type: Private.

The reason for the two queues in the online case is as follows. If the sender is offline, then it has no way of knowing what queues the receiver has. If we always create/open and service both the public and private queues, then there should not be any problems. The sender would always send to the private queues in this case. There is virtually no extra overhead in servicing the extra queues since overlapped i/o can be used. All of the queues are configured externally through MSMQ provider or through the MSMQ snap-in.

Queue Initialization occurs the first time that the CIMV2 namespace goes active. See below for more details. If online at the time of initialization, then the public and private versions of the queue will be created. If offline at the time of initialization, then only the private versions of the queue will be created.

Forwarding Event Provider

Forwarding Event Provider is called regardless of its activation status. Its "ProvideEvents( )" will always be called with a sink. When receiving this sink, the forwarding event provider starts servicing the queues. Since only guaranteed and express queues are serviced, there is little overhead in servicing them when no device is interested in the queues. The queues are serviced using the express and guaranteed receivers supplied by the "WbemMessageReceiver" layer.

WMI Event Forwarding

WMI Event Forwarding refers to the process of subscribing to WMI Events that are signaled on one machine and directing them to be signaled as WMI Events on another machine. At a high level, this is accomplished by subscribing a standard WMI Event Consumer, called the Event Forwarding Consumer, to the events to be forwarded. The action taken by this consumer when it is notified of events is to forward the events to remote machines. For each forwarded event that is received at the destination machine, a new WMI Event, called a Forwarded Event, is created that contains the original event and is signaled. Consumers interested in events that are forwarded to a machine, subscribe to Forwarded Events on that machine.

Event Forwarding Consumer

An event forwarding consumer is subscribed to events using the normal WMI event model. An instance of the event forwarding logical consumer is created and is bound to an event filter that describes the events that are to be forwarded. The way that the event forwarding consumer instance is configured directs the system on how to forward events. Destination addresses, Quality of Service (QoS), and security information are examples of configuration information exposed to the user.

The following is an abstract definition of a forwarding consumer. In later versions, there may be forwarding consumers that forward messages other than events. For now we are concerned with forwarding events.

```
[abstract]
class MSFT_ForwardingConsumer : _EventConsumer
{
    [KEY] STRING NAME;
        string Targets[ ];
        [values{ 1, 2, 3, 4 },value_map{ "Synchronous",
"Express", "Guaranteed", "Transactional"}]
        sint32 ForwardingQoS = 2;
            boolean Authenticate = TRUE;
            boolean Encryption = FALSE;
            string TargetSD;
};
```

-continued

```
class MSFT_EventForwardingConsumer : MSFT_ForwardingConsumer
{
};
``` where

"Name" is the key property identifying the instance of a "MSFT_ForwardingConsumer".

"Targets" identifies the destinations of the forwarded messages. This property is an array, so it can contain multiple destinations.

"ForwardingQoS" specifies the QoS to be used for the forwarding.

"Authenticate" tells the sender if authentication information needs to be part of the message. If the sending machine belongs to a workgroup, then this property is ignored.

"Encryption" tells the sender to encrypt the message body before sending. If the sending machine belongs to a workgroup, then this property is ignored. Encryption can be used when the sending machine is on-line.

"TargetSD" is a textual representation of a security descriptor using SDDL. This security descriptor is used for controlling which security identities can subscribe to the forwarded event at the receiving end.

Forwarded Events

A forwarding consumer forwards information using a forwarded message. When a forwarded message is received at the destination it is surfaced using a WMI Event. This event is defined in the root\cimv2 namespace and its schema looks like:

```
class Win32_WmiForwardedMessageEvent : _ExtrinsicEvent
{
    datetime Time;
    string Machine;
    string Account;
    boolean Authenticated;
};
``` where

"Time" is the time the message was sent.

"Machine" is the machine the message was sent from.

"Account" is the Security Account the message was sent under.

"Authenticated" states whether the message was authenticated by the receiver.

This class is intended to be overridden by concrete event types. Since the concern is with forwarding events, here, a concrete event class is defined which is derived from the "Win32_WmiForwardedMessageEvent".

```
class Win32_WmiForwardedEvent : Win32_WmiForwardedEvent
{
    _Event Event;
};
``` where

"Event" is the original event that was delivered to the forwarding consumer on the sender.

Events can be forwarded using a synchronous, express, or guaranteed quality of service (QoS). Synchronous QoS means that the notification of the event at the sender, the forwarding of the event to the destination, and the signaling of the event at the receiving end all take place in the same execution path. RPC communication is used for this purpose. By definition, this type of forwarding is guaranteed. However, RPC is limited in that the sending machine requires network connectivity to the receiver at the time of forwarding. In a particular embodiment, the forwarding consumer uses DCOM for synchronous communication.

The three QoS classes listed below are called asynchronous because the forwarding of the event is not in the same execution path as the notification of the event. Unlike synchronous forwarding, asynchronous forwarding uses messaging communication rather than RPC. This has the advantage of being able to forward events even when the sender and receiver are disconnected. The following are the Asynchronous QoS classes:

Express. Express forwarding makes no guarantees that the message will be received at the destination. If an error is encountered in forwarding then the event can be discarded. Because of the absence of a guarantee, however, express delivery is faster than any other asynchronous QoS.

Guaranteed. The guaranteed forwarding subsumes the express QoS class and also provides a guarantee that the event will make it to the destination at least once. This guarantee applies across machine and network failures.

Transactional. Transaction forwarding subsumes the guaranteed QoS class and also provides a guarantee that an event will make it to the destination at most once.

The forwarding consumer uses MSMQ for Messaging Communication. Using MSMQ allows the forwarding consumer to support offline forwarding and store-and-forward for all asynchronous QoS classes.

Store-and-forward refers to the ability for a message to be forwarded to a remote destination machine even when the destination machine is unreachable or down. It also allows a message to be forwarded to the destination when the source machine is unreachable or down. This means that a message can reach its destination even when the source or destination machines are never reachable or up at the same time. This is accomplished by forwarding the message to an intermediate machine if the destination is not reachable. Store-and-forward is automatically the class of delivery used when forwarding messages to a remote destination using an asynchronous QoS class.

Offline forwarding is the ability for a machine to forward messages without being connected to the network. The messages are stored locally, but when the machine goes back online, the messages are automatically forwarded. This is different than store-and-forward because, in this case, the sender does have connectivity to any machine, even the intermediate one used for store-and-forward. The two features can work together though. For example, it is possible that when the sending machine does come online, the receiving machine is down. In this case, the store-and-forward feature would be activated when the sending machine came online.

The target property of a forwarding consumer can contain one or more destination addresses. Each address is represented in one of three formats: network, indirect, or an MSMQ format name. When a forwarding consumer needs to send a message and there are multiple destinations specified, then the message will be forwarded to the targets in their order of appearance until the send is successful. A successful message send depends on the delivery class.

A network target name is any valid IP address, NetBIOS name, or DNS name. For synchronous forwarding QoS, a network target name is used to perform communication over DCOM. For asynchronous forwarding QoS, a network target name is used to perform communication over MSMQ. In this case, the target MSMQ format name will be derived from the network target name and the delivery class property.

For most cases, the user will configure network target names and the forwarding consumer will derive the low-level address of the target based on how it is configured. To override this, the user can specify a low-level MSMQ target name.

There are three types of MSMQ format names. These are public, private and direct.

Public—identifies a queue using a queue GUID.

Private—identifies a queue using a machine GUID and queue identifier.

Direct—identifies a queue using a protocol, queue location, and queue logical name.

Each type of format name has implications for sending messages. Table 3 below describes these implications.

TABLE 3

| Format/Implications | Requires Sender to be operating in On-Line mode when sending messages | Requires Sender and Receiver to be part of same forest (or MSMQ enterprise for non w2k domains) | Supports Store-And-Forward functionality |
|---|---|---|---|
| Public | Yes | Yes | Yes |
| Private | No | Yes | Yes |
| Direct | No | No | No |

A valid Target MSMQ Format Name is any valid MSMQ format name prefixed with MSMQ!.

An indirect target name can be used for indirect addressing. An indirect target name is any valid WMI instance object path prefixed by WMI! and suffixed with !<PropertyName>. When specified, the forwarding consumer will obtain the object specified in the address and use the specified property to determine the resolved address. The resolved address can be any valid network or MSMQ address, or list of valid network or MSMQ addresses. It cannot be another indirect address.

The following is an example of a valid indirect target name:

wmi!\\mymachine\root\default:
    myclass="myinstance":myprop

When an indirect target name is encountered, the value of the specified property is obtained. The type of this property must be a string or an array of strings. In both cases, the strings are treated as if they were explicitly listed in the targets property.

Each machine that can accept forwarded messages will have one or more well-known entry points. For MSMQ, these entry points are MSMQ queues. For DCOM, this entry point is a DCOM server object that is implemented by the forwarding event provider.

It is typically not necessary to perform any configuration on the receiver end of the forwarding consumer. However, it some circumstances, it may be necessary to query certain properties of the entry points and on even rarer occasions, be able to modify them. The following are the reasons why a user might need knowledge of the messaging entry points on the receiver:

To set the queue disk quota for MSMQ entry points.

To obtain queue address information for manual configuration of the target address at the sending end.

Both of these are specific to MSMQ. The MSMQ provider will model these queues. The MSMQ snap-in can also be used to access these queues. Both of these can perform the actions described above.

MSMQ Queues

All queues will have a default quota of 10 Meg.

All queues will have a security descriptor that allows only LocalSystem and administrators read and modify access, and allows everyone send access.

An administrator can distinguish between MSMQ Queues used for forwarding and those used by other applications using the queue type property.

Queues used for event forwarding will have a queue type of:

{BD29DFFF-7553-4d3b-8401-4646AC9A70C6}

Each forwarding queue is either public or private. A public queue can be referenced through a public or direct format name. A public queue can only exist on machines that are online. A Private Queue can only be referenced through a private or direct format name. There are no restrictions on the machine that private queues are created on. Furthermore, there are authenticated and non-authenticated versions of these queues.

When determining endpoint address information, the user must decide which of these types of queues they will want to use. The public/private and authentication properties of a queue each have their own set of requirements on how they can be used. This primarily depends on MSMQ installation type.

When a forwarding consumer executes, it generates trace events to facilitate debugging. There are two types of trace events:

MSFT_ForwardingConsumerTraceEvent; and

MSFT_ForwardingConsumerTargetTraceEvent

For each event that is delivered to a forwarding consumer, there will be one MSFT_ForwardingConsumerTraceEvent generated which states the outcome of the execution. For each target tried during this execution, there will be one MSFT_ForwardingConsumerTargetTraceEvent generated stating the outcome of the forwarding to that particular target. The schema for these two classes as well as their base class is described below:

```
class MSFT_ForwardingConsumerTraceEventBase : _ExtrinsicEvent
{
MSFT_ForwardingConsumer Consumer;
_Event Event;
string ExecutionId;
uint32 StatusCode;
};
```

This is the base class that all forwarding consumer trace events derive from.

"Consumer" is the forwarding consumer instance.

"Event" is the event that triggered the forwarding consumer.

"ExecutionId" is a GUID that is generated each time a forwarding consumer is delivered an event.

"StatusCode" contains the outcome of the execution of the forwarding consumer.

```
class       MSFT_ForwardingConsumerTraceEvent       :
MSFT_ForwardingConsumerTraceEventBase
{
string TargetUsed;
```

-continued

```
boolean Queued;
};
```

Each time a forwarding consumer executes, an instance of this event is signaled.

"TargetUsed" contains the address of the target that was used to successfully forward the message. This property is NULL when "StatusCode" specifies an error.

"Queued" states whether the event was forwarded using RPC or was queued. This property will be NULL when "StatusCode" specifies an error.

```
class
MSFT_ForwardingConsumerTargetTraceEvent:
MSFT_ForwardingConsumerTraceEventBase
{
string Target;
};
```

"Target" specifies the address of the target that was used to attempt to forward an event. A "ForwardingConsumerTraceEvent" can be correlated with its "ForwardingConsumerTargetTrace" events using the "ExecutionId" parameter.

When forwarding using a synchronous QoS, all errors that can occur are detected at the time of forwarding. With asynchronous forwarding, configuration errors can usually be detected at the time of forwarding as well. For these reasons, most errors can be detected by subscribing to the trace events described above (where status code specifies an error).

There are some error cases with asynchronous forwarding that cannot be detected at the time of forwarding. These errors are usually detected much later. For this reason, an event is provided that will alert any subscribers that an asynchronous error has occurred in forwarding. This event is:

```
class Win32_WmiForwardedAckEvent :
Win32_WmiForwardedMessageEvent
{
    Event Event;
    uint32 Status;
    string Target;
    uint32 QoS;
    boolean Authentication;
    boolean Encryption;
    string ConsumerPath;
    string ExecutionId;
};
```

Note that it is derived from the forwarded message event so it possesses all of its properties and semantics as well.

"Event" is the original event that was forwarded.

"Status" contains the error code for the reason why the forwarded event was returned.

"QoS" contains the value of the QoS parameter when the message was forwarded.

"Authentication" contains the value of the auth parameter when the message was forwarded.

"ConsumerPath" contains the relpath of the forwarding consumer that was responsible for forwarding the message.

"ExecutionId" contains the ExecutionId that was used to forward the original event. This id would be the same as the one contained in the "ForwardingConsumerTraceEvent" that was caused by the original event being forwarded.

Forwarding Security

For messages that are forwarded synchronously over DCOM, then DCOM security is used for authentication. For messages that are forwarded asynchronously over MSMQ, then MSMQ security is used for authentication. With respect to authentication, there are two types of entry points for receiving messages: authenticated and unauthenticated. Any message that is accepted by the authenticated entry point must have authentication information associated with it. This is a responsibility of the sender. In other words, the sender's forwarding consumer must have the authentication property set to "TRUE" in order to send to an authenticated entry point (queue). For both types of security, the sender and receiver must be part of the same forest (or MSMQ enterprise in non-w2k domains) for authentication to be possible.

A forwarded event will contain the security identity of the sender, if available. There is also a Boolean property on the event that specifies if the event has been authenticated. An unauthenticated forwarded event may still contain the identity of the sender, but only when the authenticated property is set to "TRUE" is this property to be believed. Forwarded events that are returned to the sender asynchronously because of some failure, are always verified that they actually originated from the sender.

WMI events support access control on subscriptions and on events. Access control on subscriptions state the security identity of the event providers that the subscriber is willing to receive events from. Access control on events state what security identities can subscribe to the event. When a forwarded event is signaled on the receiver, the id of the sender will be used to perform the access check controlling access to subscribers. If the forwarded event has not been authenticated, then delivery of this event will only occur to subscribers who allow "everyone" access. The forwarded event will also be signaled with a security descriptor that is passed from the sender.

Sender

For all types of forwarding QoS, if the authenticate property is set to "TRUE" on the forwarding consumer, then it will attach authentication info with the message and send it to the authenticated entry point on the target. If the property is set to "FALSE", then the message is sent to the unauthenticated entry point on the target.

The sending identity of forwarded messages depends on two factors: platform and type of forwarding consumer. For event forwarding consumers, the identity of the message depends on the "MaintainSecurityContext" property of the binding to the forwarding consumer. If the "MaintainSecurityContext" property is "TRUE", then the security principal attached to the forwarded messages will be the same as the event providers. If the "MaintainSecurityContext" property is "FALSE" or in the case of a data forwarding consumer, the message is sent using the account that winmgmt is running under. For all NT platforms, this account is Localsystem. On win2k and higher platforms this identity be used for authentication. On older platforms, authentication cannot occur unless the forwarding consumer is run out of proc to winmgmt. This is possible, but will require that the administrator adjust the DCOM registration of the forwarding consumer to run out-of-proc and under a specific domain account.

For authenticated asynchronous forwarding, the sending security principal is registered with MSMQ. When the forwarding consumer is initialized, it will try to register the account it is running under with MSMQ. Registration occurs when the machine is running in online mode.

Only in the case where "MaintainSecurityContext" is set to "TRUE", the forwarding consumer is an event Forwarding consumer, the forwarding QoS is asynchronous, and the platform is not win2k or higher will the administrator be responsible for registering the account with MSMQ manually.

The forwarding consumer will have the ability to specify a DACL to control what consumers can receive the messages on the receiving end. By default, there will be no DACL, thereby allowing all consumers to subscribe to messages that the forwarding consumer sends. An administrator must construct the DACL to set on the forwarding consumer. This can be done using Win32 Security APIs or through scripting helper objects.

A forwarding consumer will encrypt all messages that it sends when its "Encrypt" property is set to "TRUE". Encryption of messages cannot be performed when the sending machine is offline. Encryption cannot be used when forwarding messages to a machine outside the win2k forest (MSMQ enterprise for non-win2k domains).

The forwarding consumer will be part of a WMI installation. The schema for the forwarding consumer will exist in the root\default namespace. Installation of the schema of the forwarding consumer will be installed by default into the root\default namespace, but can be installed by the user in other namespaces.

The forwarding receiver will support MSMQ independent client and server installations.

There are two modes of operation for the forwarding consumer and receiver with respect to MSMQ: Online and Offline. These terms refer to connectivity to an MSMQ Server. There are two types of MSMQ installations: Workgroup and Domain. A workgroup installation is always treated as Offline.

On initialization of winmgmt, domain membership and connectivity to a DC are checked. If both are true, then winmgmt will operate in Online mode with respect to MSMQ. If not, then it operates in Offline Mode.

FIG. 6 illustrates an example of a suitable operating environment in which the event management system described herein may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, mini-computers, mainframe computers, distributed computing environments that include any of the above systems or devices, and the like.

FIG. 6 shows a general example of a computer 442 that can be used in accordance with the invention. Computer 442 is shown as an example of a computer that can perform the various functions described herein. Computer 442 includes one or more processors or processing units 444, a system memory 446, and a bus 448 that couples various system components including the system memory 446 to processors 444.

The bus 448 represents one or more of any of several types of bus structures, including a memory bus or memory controller, a peripheral bus, an accelerated graphics port, and a processor or local bus using any of a variety of bus architectures. The system memory 446 includes read only memory (ROM) 450 and random access memory (RAM) 452. A basic input/output system (BIOS) 454, containing the basic routines that help to transfer information between elements within computer 442, such as during start-up, is stored in ROM 450. Computer 442 further includes a hard disk drive 456 for reading from and writing to a hard disk, not shown, connected to bus 448 via a hard disk drive interface 457 (e.g., a SCSI, ATA, or other type of interface); a magnetic disk drive 458 for reading from and writing to a removable magnetic disk 460, connected to bus 448 via a magnetic disk drive interface 461; and an optical disk drive 462 for reading from and/or writing to a removable optical disk 464 such as a CD ROM, DVD, or other optical media, connected to bus 448 via an optical drive interface 465. The drives and their associated computer-readable media provide nonvolatile storage of computer readable instructions, data structures, program modules and other data for computer 442. Although the exemplary environment described herein employs a hard disk, a removable magnetic disk 460 and a removable optical disk 464, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 460, optical disk 464, ROM 450, or RAM 452, including an operating system 470, one or more application programs 472, other program modules 474, and program data 476. A user may enter commands and information into computer 442 through input devices such as keyboard 478 and pointing device 480. Other input devices (not shown) may include a microphone, joystick, game pad, satellite dish, scanner, or the like. These and other input devices are connected to the processing unit 444 through an interface 468 that is coupled to the system bus (e.g., a serial port interface, a parallel port interface, a universal serial bus (USB) interface, etc.). A monitor 484 or other type of display device is also connected to the system bus 448 via an interface, such as a video adapter 486. In addition to the monitor, personal computers typically include other peripheral output devices (not shown) such as speakers and printers.

Computer 442 operates in a networked environment using logical connections to one or more remote computers, such as a remote computer 488. The remote computer 488 may be another personal computer, a server, a router, a network PC, a peer device or other common network node, and typically includes many or all of the elements described above relative to computer 442, although only a memory storage device 490 has been illustrated in FIG. 6. The logical connections depicted in FIG. 6 include a local area network (LAN) 492 and a wide area network (WAN) 494. Such networking environments are commonplace in offices, enterprise-wide computer networks, intranets, and the Internet. In certain embodiments, computer 442 executes an Internet Web browser program (which may optionally be integrated into the operating system 470) such as the "Internet Explorer" Web browser manufactured and distributed by Microsoft Corporation of Redmond, Wash.

When used in a LAN networking environment, computer 442 is connected to the local network 492 through a network interface or adapter 496. When used in a WAN networking environment, computer 442 typically includes a modem 498 or other means for establishing communications over the wide area network 494, such as the Internet. The modem 498, which may be internal or external, is connected to the system bus 448 via a serial port interface 468. In a networked environment, program modules depicted relative to the personal computer 442, or portions thereof, may be stored in the remote memory storage device. It will be appreciated that the network connections shown are exemplary and other means of establishing a communications link between the computers may be used.

Computer 442 typically includes at least some form of computer readable media. Computer readable media can be any available media that can be accessed by computer 442. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 442. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. An event management system having an associated processor and computer-readable storage medium coupled to the processor, comprising:
 a set of event consumers, each of the event consumers in the set of event consumers being configured to perform an action in response to an occurrence of an event; and
 an event management module configured to create:
 an event filter object having at least two properties that identify events that are intended to cause one or more actions to be performed; and
 a binding object to specify at least two binding properties to bind the event filter object to one or more of the event consumers in the set of event consumers, the binding object binding the event filter object to at least one event consumer in the set of event consumers when the properties presented by the event filter object match the at least two binding properties of the binding object, the at least one event consumer being to execute when one or more of the events associated with the event filter object occurs.

2. An event management system of claim 1, wherein the set of event consumers includes at least one of:
   an email consumer configured to handle email messages;
   a paging consumer configured to generate a page message;
   an active scripting consumer configured to execute at least one script;
   a log file consumer configured to record information in a log file;
   an event log consumer configured to log messages to an event log; or
   a command line consumer configured to launch at least one process.

3. An event management system of claim 2, wherein the email consumer is an SMTP consumer.

4. An event management system of claim 2, wherein the event log consumer is an NT event log consumer.

5. An event management system of claim 2, further comprising a forwarding consumer to forward events.

6. An event management system of claim 1, wherein events in the event management system are represented as objects.

7. An event management system of claim 1, wherein each consumer in the event management system is represented as a class.

8. An event management system of claim 1, wherein the event management module is configured, independent of the event filter object and the set of event consumers, to provide selective association and disassociation of the event filter object and the event consumers.

9. An event management system of claim 1, further comprising an event provider, wherein the event provider includes at least one of:
   a Win32 provider;
   a Windows Driver Model (WDM) provider;
   an event log provider;
   a registry provider;
   a performance counter provider;
   a active directory provider;
   a Windows installer provider; or
   a Simple Network Management Protocol (SNMP) provider.

10. A computer system having an associated processor and computer-readable storage medium coupled to the processor, comprising:
    an event provider configured to generate events;
    an event consumer selected from a set of event consumers, the event consumer being configured to perform an action in response to an occurrence of an event generated by the event provider;
    an event filter configured to specify at least two properties about the event in response to the occurrence of the event; and
    a binding object specifying at least two binding properties to bind the event filter to the event consumer selected from the set of event consumers, wherein the event filter when bounded to the at least one selected event consumer is to invoke the event consumer when the properties specified by the event filter match the binding properties of the binding object.

11. A computer system of claim 10, wherein the set of event consumers include at least one of:
    an email consumer configured to send at least one email message;
    a paging consumer configured to send at least one page message;
    an active scripting consumer configured to execute at least one script;
    a log file consumer configured to record information in a log file;
    an event log consumer configured to log at least one message to an event log; or
    a command line consumer configured to launch at least one process.

12. A computer system of claim 10, wherein the event providers includes at least one of:
    a Win32 provider;
    a Windows Driver Model (WDM) provider;
    an event log provider;
    a registry provider;
    a performance counter provider;
    a active directory provider;
    a Windows installer provider; or
    a Simple Network Management Protocol (SNMP) provider.

13. A computer system of claim 10, wherein the event consumer includes an instance of a class associated with an application program.

14. A computer system of claim 10, wherein the event filter includes an instance of a class associated with an application program.

15. A computer system of claim 10, further comprising an event management module configured, independent of the event filter and the set of event consumers, to provide selective association and disassociation of the event filter and the event consumers.

16. A computer implemented method, comprising:
    receiving, from a user, event filter information to use in implementing at least one event filter;
    implementing a plurality of event filters based on the received event filter information, wherein each of the event filters specifies at least two criteria indicative of a triggering event arising within a computing system, the triggering event indicating that one or more actions is to be performed;
    receiving, from the user, an instruction to implement a plurality of event consumers, each of the plurality of event consumers being configured to perform at least one action in response to a triggering event arising within the computing system; and
    receiving, from the user, an instruction to implement at least one binding object, the binding object configured to provide selective association of at least one of the plurality of event filters with at least one of the plurality of event consumers, such that when the two criteria of the at least one of the plurality of event filters occur, an associated at least one of the plurality of event consumers is executed to perform at least one action in response to the occurrence of the two criteria.

17. A method of claim 16, wherein the binding object is configured to provide selective association of between at least one of the plurality of event filters consumers with at least one of the plurality of event consumers independently of the plurality of event filters and plurality of event consumers.

18. A method of claim 16, wherein the binding object is configured to provide selective association of a selected plurality of event filters with a single selected event consumer.

19. The method of claim 16, wherein the binding object is configured to provide selective association of a single selected event filter with a selected plurality of event consumers.

20. The method of claim 16, wherein at least one of the plurality of event filters is configured to perform at least one action, including:

sending an email;
generate a page message;
execute at least one script;
recording information in a log file;
logging messages to an event log; or
launching at least one process.

* * * * *